United States Patent [19]

Morris et al.

[11] Patent Number: 5,003,041

[45] Date of Patent: Mar. 26, 1991

[54] BLENDS OF POLY(ETHYLENE TEREPHTHALATE) AND TRANS-4,4'-STILBENEDICARBOXYLIC ACID POLYESTERS

[75] Inventors: John C. Morris; Winston J. Jackson, Jr., both of Kingsport, Tenn.

[73] Assignee: Eastman Kodak Company, Rochester, N.Y.

[21] Appl. No.: 289,345

[22] Filed: Dec. 23, 1988

[51] Int. Cl.$^5$ ............................................. C08L 67/02
[52] U.S. Cl. ................................. 525/444; 525/933; 428/910
[58] Field of Search ................................. 525/444, 933

[56] References Cited

U.S. PATENT DOCUMENTS

| | | |
|---|---|---|
| 2,657,194 | 10/1953 | Butler et al. . |
| 2,657,195 | 10/1953 | Toland . |
| 3,190,764 | 6/1965 | Cardina . |
| 3,247,043 | 4/1966 | Cardina . |
| 3,496,839 | 2/1970 | Hartle . |
| 3,842,040 | 10/1974 | Browne et al. . |
| 3,842,041 | 10/1974 | Browne et al. . |
| 4,073,777 | 2/1978 | O'Neill et al. . |
| 4,420,607 | 12/1983 | Morris et al. . |
| 4,459,402 | 7/1984 | Morris et al. . |
| 4,468,510 | 8/1984 | Morris et al. . |
| 4,526,822 | 7/1985 | Morris et al. . |
| 4,551,368 | 11/1985 | Smith ................................ 428/35 |
| 4,578,295 | 3/1986 | Jabarin ............................. 428/35 |
| 4,728,717 | 3/1989 | Morris et al. . |
| 4,728,718 | 3/1988 | Morris et al. . |
| 4,728,719 | 3/1988 | Morris et al. . |
| 4,728,720 | 3/1988 | Morris et al. . |
| 4,729,927 | 3/1988 | Hirose .............................. 428/480 |
| 4,739,033 | 4/1988 | Morris et al. . |

FOREIGN PATENT DOCUMENTS 7234874 7/1974 Japan .

OTHER PUBLICATIONS

Meurisse et al., *British Polymer Journal*, vol. 13, 1981, p. 57.

Jackson et al., *Journal of Applied Polymer Science, Applied Polymer Symposia*, 41, 307–326 (1985).

*Primary Examiner*—Patricia Short
*Attorney, Agent, or Firm*—Mark A. Montgomery; Thomas R. Savitsky; William P. Heath, Jr.

[57] ABSTRACT

Disclosed are blends of about 99 to about 10 weight % of poly(ethylene terephthalate) and about 1 to about 90 weight % of a polyester of trans-4,4'-stilbenedicarboxylic acid and at least one aliphatic glycol having 2 to 16 carbon atoms. The blends have improved gas barrier properties and improved chemical resistance.

2 Claims, No Drawings

BLENDS OF POLY(ETHYLENE TEREPHTHALATE) AND TRANS-4,4'-STILBENEDICARBOXYLIC ACID POLYESTERS

FIELD OF INVENTION

The present invention concerns blends of poly(ethylene terephthalate) and polyesters from trans-4,4'-stilbenedicarboxylic acid and aliphatic glycols. The blends have improved gas barrier properties and improved chemical resistance.

BACKGROUND OF THE INVENTION

U.S. Pat. No. 4,526,822 discloses shaped articles prepared from copolyesters of terephthalic acid, trans-4,4'-stilbenedicarboxylic acid, and ethylene glycol having improved gas barrier properties and U.S. Pat. No. 4,468,510 discloses copolyesters of 2,6-naphthalenedicarboxylic acid, terephthalic acid, trans-4,4'-stilbenedicarboxylic acid, 1,2-propanediol, and 1,3-propanediol having improved gas barrier properties. Blends of these polymers with other polymers are not disclosed in either patent.

Japanese Kokai 72348/74 discloses specific blends of 40 to 45 weight % of the homopolyester of trans-4,4'-stilbenedicarboxylic acid and 1,6-hexanediol with the polyester prepared from dimethyl terephthalate and 1,4-butanediol (PBT). These blends have enhanced heat resistance compared to unmodified PBT. No poly(ethylene terephthalate) blends are disclosed.

U.S. Pat. No. 2,657,194 and U.S. Pat. No. 2,657,195 broadly or generally disclose polyesters of various stilbenedicarboxylic acid isomers with oxyalkylene glycols having 2 to 6 oxyalkylene linkages, as well as certain other glycols, aminoalcohols, and diamines. Various glycols are disclosed containing 2 to 16 carbon atoms but blends of these polymers with other polyesters or other polymers are not disclosed (see column 8, line 36 of U.S. Pat. No. 2,657,195). U.S. Pat. No. 3,496,839 relates to low molecular weight homopolymers of 4,4'-stilbenedicarboxylic acid and aliphatic glycols useful in radiation-cured crosslinked polyester coatings. Our own U.S. Pat. No. 4,420,607, U.S. Pat. No. 4,459,402, U.S. Pat. No. 4,468,510, U.S. Pat. No. 4,526,822, all disclose polyesters based on trans-4,4'-stilbenedicarboxylic acid using various glycols. No examples or teachings of blends are given.

Other patents which disclose trans-4,4'-stilbenedicarboxylic acid polyesters are U.S. Pat. No. 2,657,194, U.S. Pat. No. 3,190,774, U.S. Pat. No. 3,247,043, U.S. Pat. No. 3,842,040, U.S. Pat. No. 3,842,041, and U.S. Pat. No. 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al., in the *British Polymer Journal*, Volume 13, 1981, page 57 (Table 1). Jackson and Morris disclose homopolyesters from trans-4,4'-stilbenedicarboxylic acid and various aliphatic glycols in the *Journal of Applied Polymer Science, Applied polymer Symposia*, 41, 307–326 (1985).

Heretofore, blends of poly(ethylene terephthalate) and copolyesters from trans-4,4'-stilbenedicarboxylic acid and aliphatic glycols have been unknown.

SUMMARY OF THE INVENTION

The present invention is directed to a polymer blend comprising
 (A) about 99 to about 10 weight % of poly(ethylene terephthalate) having an inherent viscosity of greater than or equal to about 0.4 determined at 25° C. in 25/35/40 (wt./wt./wt.) phenol/tetrachloroethane/ p-chlorophenol at a concentration of 0.5 g/100 mL, and
 (B) about 1 to about 90 weight % of a polyester comprising repeating units of trans-4,4'-stilbenedicarboxylic acid and at least one aliphatic glycol having 2 to 16 carbon atoms wherein said polyester has an inherent viscosity of greater than or equal to about 0.1 determined at 25° C. in 25/35/40 (wt./wt./wt.) phenol/tetrachloroethane/ p-chlorophenol at a concentration of 0.1 g/100 mL.

A preferred polymer blend of the present invention comprises
 (A) about 99 to about 10 weight % of poly(ethylene terephthalate) having an inherent viscosity of greater than or equal to about 0.4 determined at 25° C. in 25/35/40 (wt./wt./wt.) phenol/tetrachloroethane/ p-chlorophenol at a concentration of 0.1 g/100 mL, and
 (B) about 1 to about 90 weight % of a homopolyester comprising of repeating units of trans-4,4'-stilbenedicarboxylic acid, and diethylene glycol or 1,6-hexanediol, wherein said homopolyester has an inherent viscosity of greater than or equal to about 0.6 determined at 25° C. in 25/35/40 (wt./wt./wt.) phenol/tetrachloroethane/p-chlorophenol at a concentration of 0.1 g/100 mL.

DETAILED DESCRIPTION OF THE INVENTION

The prior art discloses molding, spinning, and extrusion into film as viable processes for shaping the individual polyesters of this invention. Oriented or shaped objects from blends of poly(ethylene terephthalate) (PET) and stilbenedicarboxylic acid (SDA) homopolyesters and copolyesters are not disclosed.

The blends of this invention provide a novel way of reducing the gas barrier properties of poly(ethylene terephthalate), which has begun to find wide commercial acceptance in food packaging and other miscellaneous applications. We have found, for example, that it is not possible to biaxially orient the SDA polyesters of the prior art. Generally, this is because the polymers are highly anisotropic, i.e., the film is already oriented in the direction of film extrusion or is highly crystalline. Films of SDA polyesters tend to crack or tear along the film extrusion direction as the film exits the die during melt extrusion of the polyesters. Also, SDA polyesters are very crystallizable and very crystalline polymeric materials. It is not usually possible to prepare completely amorphous films by quenching films of many of the SDA polyesters of the art as is typical for polyesters such as poly(ethylene terephthalate). Hence, when attempts are made to reheat extruded film of the SDA polyester films prior to biaxial orientation, the films typically crystallize even more, preventing further extension of the polymer chains during biaxial orientation. The films often tear when stretched 200% to 300% in a manner similar to PET and will not orient.

In addition to discovering the blends having inherently improved gas barrier properties compared to unmodified PET, we have discovered that by blending these unorientable SDA copolyesters with poly(ethylene terephthalate) we are able to obtain blends which can be biaxially oriented. For example,. stretch blown bottles of an 80/20 wt./wt. PET/(SDA)(DEG) blend have one-half the oxygen permeability of unmodified PET, i.e., the oxygen transmission rate is 3.4 for the blend vs 7.2 cc-mil/100 in$^2$-24 hr-atm for the unmodified PET control.

As little as 1 weight % of the homopolyester of trans-4,4'-stilbenedicarboxylic acid and diethylene glycol (DEG) or the homopolyester of trans-4,4'-stilbenedicarboxylic acid and 1,6-hexanediol reduces the carbon dioxide gas transmission rate of extruded PET film 20% to 30%. However, about 10 weight % of SDA polyester content is required to detect a noticeable decrease in the gas permeability of biaxially oriented films.

In the polymer blends of the present invention it is preferred that the weight % of component (A) is about 5 to about 90 and the weight % of component (B) is about 95 to about 10.

In the polymer blends of the present invention it is preferred that said aliphatic glycol of component (B) is diethylene glycol, ethylene glycol, 1,6-hexanediol, 1,4-butanediol, 1,3-propanediol, neopentyl glycol, 1,5-pentanediol, 1,4-cyclohexanedimethanol or 1,10-dencanediol.

It is also preferred that component (B) is a homopolyester of trans-4,4'-stilbenedicarboxylic acid and a glycol having 2 to 16 carbon atoms.

The polyester of component (B) may be modified with up to about 30 mol % of other aromatic dicarboxylic acids having up to 16 carbon atoms such as terephthalic acid, 2-chloroterephthalic acid, 2,6-naphthalenedicarboxylic acid, 4,4'-biphenyldicarboxylic acid, and isophthalic acid without substantially adversely affecting gas barrier properties of the blends.

It is more preferred that the poly(ethylene terephthalate) of component (A) is modified with about 0 to about 20 mol of a first modifier, and that the polyester of component (B) is modified with about 0 to about 20 mol % of a second modifier.

It is also preferred that the inherent viscosity of component (A) is greater than or equal to about 0.6. and the inherent viscosity of component (B) is greater than or equal to about 0.2.

The PET portion of the blends suitable for blending with the SDA polyester should have an inherent viscosity of at least 0.4 but preferably 0.6 or more. The PET portion of the blend may also be modified with up to about 30 mol % of other glycols having 2 to 16 carbon atoms or other dicarboxylic acids having 2 to 16 carbon atoms. Examples of suitable dicarboxylic acid modifiers include aliphatic dicarboxylic acids such as malonic, succinic, glutaric, adipic, pimelic, azelaic, suberic, sebacic, dodecanedicarboxylic, and cis- or trans-1,4-cyclohexanedicarboxylic acids and aromatic dicarboxylic acids such as isophthalic, 4,4'-biphenyldicarboxylic, trans-4,4'-stilbenedicarboxylic, 2,6-naphthalenedicarboxylic, 2-chloroterephthalic, and 2,5-dichloroterephthalic acids. The glycol portion of the PET may be modified with various glycols which include 1,2-propanediol, 1,3-propanediol, 2,2-dimethyl-1,3-propanediol, 1,4-butanediol, 1,5-pentanediol, 1,6-hexanediol, p-xylenediol, and 1,3- or 1,4-cyclohexanedimethanol (trans and/or cis).

It is preferred that when the polymer blend of the present invention is in the form of an extruded film then it has a carbon dioxide permeability of less than or equal to 55 cc-mil/100 in$^2$-24 hr-atm.

More specific, preferred blends of the present invention are as follows (1) the glycol component of component (B) comprises about 60 to 95 mol % 1,4-butanediol, and about 5 to 40 mol % ethylene glycol, (2) the glycol component of component (B) comprises about 65 to 95 mol % 1,6-hexanediol, and about 5 to 35 mol % ethylene glycol and (3) the glycol component of component (B) comprises about 5 to 95 mol % 1,4-butanediol and 5 to 95 mol % 1,6-hexanediol.

The following examples are to illustrate the invention but should not be interpreted as a limitation thereon.

The inherent viscosities (I.V.'s) of the polyesters are determined in 25/35/40 phenol/tetrachloroethane/p-chlorophenol at 25° C. at concentration of 0.1 gram (g)/100 milliliters (mL). The components are dry-blended, dried at 100° C., and extruded on a Werner-Pfleiderer extruder or on a ¾-inch Brabender extruder at 280° to 300° C. and pelletized. The blends are redried at 100° C. and extruded into 20-mil by about 6-inch film. The films are biaxially oriented on a T. M. Long film stretcher. The oxygen permeability is determined on a Mocon Model 1000 or Model 10/50 oxygen permeability tester at 30° C. and 68% relative humidity, and the carbon dioxide permeability is determined on a Mocon permatran C IV permeability tester at 0% relative humidity.

EXAMPLE 1

This example illustrates the extrusion and film stretching of PET 7352 (I.V.=0.85) obtained from Eastman Chemicals Products, Inc.

PET 7352 was extruded into film at 280° C. and stretched 4X by 4X (300%) on a T. M. Long film stretcher. The biaxially oriented film had an oxygen permeability of 6.1 cc-mil/100 in$^2$-24 hr-atm and a carbon dioxide permeability of 31.5 cc-mil/100 in$^2$-24 hr-atm.

EXAMPLE 2

This example illustrates the preparation of the polyester from 100 mol % trans-4,4'-stilbenedicarboxylic acid units and 100 mol % diethylene glycol units.

A mixture of 207.2 g (0.70 mol) dimethyl trans-4,4'-stilbenedicarboxylate, 111.3 g (1.05 mol) diethylene glycol, and 0.14 g titanium tetraisopropoxide is placed in a one-liter flask equipped with an inlet for nitrogen, a metal stirrer, and a short distillation column. The flask is heated at 235° C. for about 1.5 hours and the temperature is raised to 275° C. for about 20 minutes. A vacuum of 0.5 mm is gradually applied over the next 10 to 15 minutes. Full vacuum is maintained for about 20 minutes. A high melt viscosity yellow polymer with an I.V. of 0.85 is obtained.

The polymer is ground to pass a 3-mm screen and dry blended with 70 weight % PET 7352 (I.V.=0.85, Eastman Chemicals Products, Inc.). The blend is extruded and pelletized, and then extruded into film, and subsequently biaxially oriented 3X by 3X or 200% on a T. M. Long film stretcher at 100° C. The oriented film has an oxygen permeability of 2.7 cc-mil 100 in$^2$-24 hr-atm and a carbon dioxide permeability of 12.9 cc-mil/100 in$^2$-24 hr-atm.

EXAMPLE 3

This example illustrates the preparation of a blend of PET 7741 having an I.V.=0.75 and the (SDA)(DEG) homopolyester of Example 2.

The polymer of Example 2 is ground to pass a 3-mm screen and dry blended with 70 weight % PET 7741 (I.V.=0.75 Eastman Chemicals Products. Inc.). The blend is extruded and pelletized, and then extruded into film, and subsequently biaxially oriented 3X by 3X (200%) on a T. M. Long film stretcher at 100° C. The oriented film has an oxygen permeability of 2.7 cc-mil/100 in$^2$-24 hr-atm and a carbon dioxide permeability of 12.9 cc-mil/100 in$^2$-24 hr-atm.

The other polyesters and blends shown in the tables are prepared according to procedures similar to those described in Examples 1 and 2 above. In Table 3 the numbers preceding the acid components refer to mol %. For example, the second entry on Table 3 recites "90(SDA)10(T)(DEG)". This is a polyester consisting of 90 mol % trans-4,4'-stilbenedicarboxylic acid, 10 mol % terephthalic acid, and 100 mol % diethylene glycol. This polyester, at a 30 weight % level, is blended with 70 weight % poly(ethylene terephthalate).

TABLE 1

Gas Barrier Properties of Films of PET/(SDA)(DEG) Polyester/Polyester Blends

| PET 7352 Content, wt. % | (SDA)(DEG) Content, wt. % | Oxygen Permeability$^a$ | | Carbon Dioxide Permeability$^a$ | |
|---|---|---|---|---|---|
| | | Ext. | Oriented | Ext. | Oriented |
| 100 (control)$^b$ | 0 | 12.4 | 6.1 | 65.3 | 31.4 |
| 99$^b$ | 1 | 11.8 | 5.0 | 42.4 | 34.8 |
| 95$^b$ | 5 | 13.2 | 5.8 | 42.0 | 32.6 |
| 90$^b$ | 10 | 9.6 | 4.8 | 48.2 | 30.8 |
| 80$^b$ | 20 | 8.5 | 2.8 | 35.6 | 29.3 |
| 70$^c$ | 30 | 6.6 | 3.0 | 29.2 | 13.0 |
| 50$^c$ | 50 | 6.5 | 1.2 | — | 7.5 |
| 30$^d$ | 70 | 1.0 | 1.6 | — | — |

$^a$Gas permeability is measured in units of cc-mil/100 in$^2$-24 hr-atm.
$^b$These films were biaxially oriented 300% on a T.M. Long Film Stretcher at 100° C.
$^c$These films were biaxially oriented 200% on a T.M. Long Film Stretcher at 100° C.
$^d$This film could not be biaxially oriented at 100° C.
Codes:
PET = poly(ethylene terephthalate) (PET 7352, Eastman Chemicals Products, Inc.)
SDA = trans-4,4'-stilbenedicarboxylic acid.
DEG = diethylene glycol.

TABLE 2

Gas Barrier Properties of Films of PET/(SDA)(HD) Polyester/Polyester Blends

| PET 7352 Content, wt. % | (SDA)(HD) Content, wt. % | Oxygen Permeability$^a$ | | Carbon Dioxide Permeability$^a$ | |
|---|---|---|---|---|---|
| | | Ext. | Oriented | Ext. | Oriented |
| 100 (control)$^b$ | 0 | 12.4 | 6.1 | 65.3 | 31.4 |
| 99$^b$ | 1 | 11.1 | 6.5 | 43.8 | 30.8 |
| 95$^b$ | 5 | 10.8 | 6.4 | 50.6 | 28.8 |
| 90$^c$ | 10 | 10.6 | 5.6 | 39.0 | 29.5 |
| 70$^d$ | 30 | 8.4 | 4.4 | 33.1 | 20.6 |
| 50$^e$ | 50 | 4.6 | — | 13.1 | — |
| 30$^e$ | 70 | 7.8 | — | 10.6 | — |
| 20$^e$ | 80 | 4.0 | — | 11.3 | — |
| 10$^e$ | 90 | 3.2 | — | 7.9 | — |

$^a$Gas permeability is measured in units of cc-mil/100 in$^2$-24 hr-atm.
$^b$These films were biaxially oriented 300% on a T.M. Long Film Stretcher at 100° C.
$^c$These films were biaxially oriented 200% on a T.M. Long Film Stretcher at 100° C.
$^d$These films were biaxially oriented 250% on a T.M. Long Film Stretcher at 100° C.
$^e$This film could not be biaxially oriented at 100° C.
Codes:
PET = poly(ethylene terephthalate) (PET 7352, Eastman Chemicals Products, Inc.)
SDA = trans-4,4'-stilbenedicarboxylic acid.
HD = 1,6-hexanediol.

TABLE 3

Biaxially Oriented Films of Blends of PET with Modified SDA Copolyesters

| SDA Polyester | Level of Modifier wt. % | Oxygen Permeability$^a$ | | Carbon Dioxide$^e$ Permeability$^a$ | |
|---|---|---|---|---|---|
| | | Ext. | Oriented | Ext. | Oriented |
| PET (Control)$^b$ | 0 | 12.4 | 6.1 | 65.3 | 31.5 |
| 90(SDA)10(T)(DEG)$^b$ | 30 | 6.3 | 2.9 | 29.0 | 15.1 |
| 80(SDA)20(T)(DEG)$^c$ | 30 | 7.7 | 3.7 | 31.0 | 17.4 |
| 70(SDA)30(T)(DEG)$^c$ | 30 | 8.1 | 4.1 | 23.2 | 16.2 |
| 90(SDA)10(CT)(HD)$^d$ | 30 | 8.7 | 6.5 | 28.1 | 25.1 |
| 80(SDA)20(CT)(HD)$^d$ | 30 | 8.2 | 5.1 | 28.0 | 19.1 |
| 80(SDA)20(CT)(BD)$^e$ | 30 | 7.5 | 3.4 | 45.4 | 17.8 |
| 90(SDA)10(CT)(DEG)$^d$ | 30 | 6.9 | 2.2 | 27.4 | 12.3 |
| 80(SDA)20(CT)(DEG)$^d$ | 30 | 7.2 | 3.4 | 29.1 | 13.7 |

$^a$Gas permeability is measured in units of cc-mil/100 in$^2$-24 hr-atm.
$^b$These films were biaxially oriented 200% on a T.M. Long Film Stretcher at 100° C.
$^c$These films were biaxially oriented 300% on a T.M. Long Film Stretcher at 100° C.
$^d$These films were biaxially oriented 250% on a T.M. Long Film Stretcher at 100° C.
Codes:
PET = poly(ethylene terephthalate) (PET 7352, Eastman Chemicals Products, Inc.)
SDA = trans-4,4'-stilbenedicarboxylic acid.
DEG = diethylene glycol.
HD = 1,6-hexanediol.
BD = 1,4-butanediol.
CT = 2-chloroterephthalic acid.
T = terephthalic acid The invention has been described in detail with particular reference to preferred embodiments thereof, but it will be understood that variations and modifications can be effected within the spirit and scope of the invention.

We claim:

1. A polymer blend comprising
   (A) about 99 to about 10 weight % of poly(ethylene terephthalate) having an inherent viscosity of greater than or equal to about 0.4 determined at 25° C. in 25/35/40 (wt./wt./wt.) phenol/tetrachloroethane/ p-chlorophenol at a concentration of 0.1 g/100 mL, and
   (b) about 1 to about 90 weight % of a homopolyester comprising repeating units of trans-4,4'-stilbenedicarboxylic acid, and diethylene glycol or 1,6-hexanediol, wherein said homopolyester has an inherent viscosity of greater than or equal to about 0.6 determined at 25° C. in 25/35/40 (wt./wt./wt.) phenol/tetrachloroethane; p-chlorophenol at a concentration of 0.1 g/100 mL.

2. A polymer blend comprising
   (A) about 99 to about 10 weight % of poly(ethylene terephthalate) having an inherent viscosity of greater than or equal to about 0.4 determined at 25° C. in 25/35/40 (wt./wt./wt.) phenol/tetrachloroethane/p-chlorophenol at a concentration of 0.1 g/100 ml, and
   (B) about 1 to about 90 weight % of a polyester comprising repeating units of trans-4,4'-stilbenedicarboxylic acid and a glycol component comprising about 60 to 95 mole % 1,4-butanediol and about 5 to 40 mole % ethylene glycol or about 65 to 95 mole % 1,6-hexanediol and about 5 to 35 mole % ethylene glycol wherein said polyester has an inherent viscosity greater than or equal to about 0.1 determined at 25° C. in 25/35/40 (wt./wt./wt.) phenol/tetrachloroethane/p-chlorophenol at a concentration of 0.1 g/100 ml.

* * * * *

UNITED STATES PATENT AND TRADEMARK OFFICE
CERTIFICATE OF CORRECTION

PATENT NO. : 5,003,041
DATED : Mar. 26, 1991
INVENTOR(S) : John C. Morris, Winston J. Jackson, Jr.

It is certified that error appears in the above-identified patent and that said Letters Patent is hereby corrected as shown below:

Column 7, Line 18 should read:

phenol/tetrachloroethane/p-chlorophenol at a

Signed and Sealed this

Fourth Day of August, 1992

Attest:

DOUGLAS B. COMER

Attesting Officer

Acting Commissioner of Patents and Trademarks